UNITED STATES PATENT OFFICE.

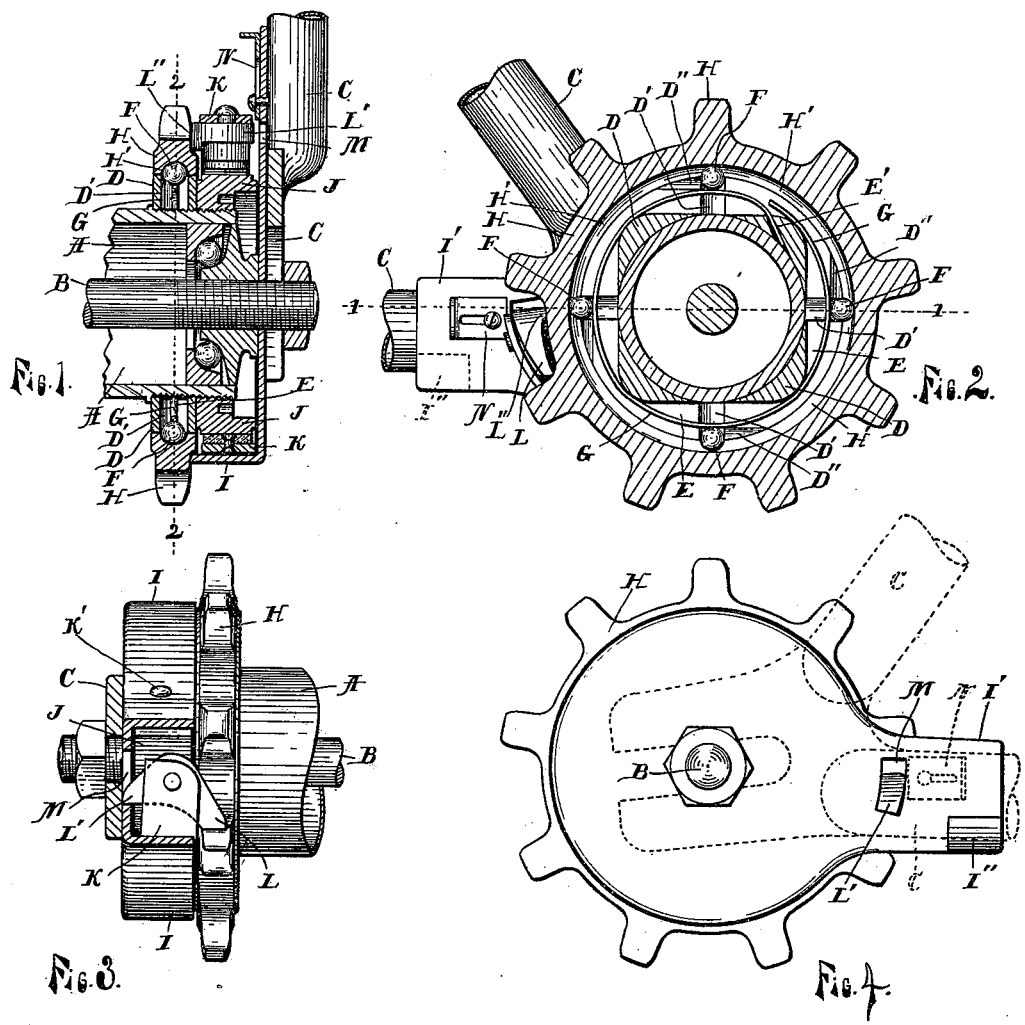

FREDERICK P. HINCKLEY, OF JACKSON, MICHIGAN, ASSIGNOR OF ONE-HALF TO JOHN McDEVITT, OF SAME PLACE.

BACK-PEDALING BRAKE.

SPECIFICATION forming part of Letters Patent No. 643,600, dated February 13, 1900.

Application filed November 14, 1898. Serial No. 696,402. (No model.)

*To all whom it may concern:*

Be it known that I, FREDERICK P. HINCKLEY, a citizen of the United States, residing at Jackson, in the county of Jackson and State of Michigan, have invented certain new and useful Improvements in a Combined Back-Pedal Brake and Coaster; and I do hereby declare the following to be a full, clear, and exact description of the invention, such as will enable others skilled in the art to which it appertains to make and use the same.

My invention relates to improvements in combined back-pedal brakes and coasters for bicycles; and its object is to provide a cheap and compact device that can be placed on any bicycle as usually constructed by simply removing the rear sprocket and lock-nut and inserting my device instead, and also to provide said device with certain new and useful features hereinafter more fully described, and particularly pointed out in the claims, reference being had to the accompanying drawings, in which—

Figure 1 is a horizontal section of a device embodying my invention, taken on the line 1 1 of Fig. 2; Fig. 2, a vertical section of the same on the line 2 2 of Figs. 1 and 2; Fig. 3, a front elevation of my device with a part broken away, and Fig. 4 a side elevation of the same.

Like letters refer to like parts in all of the figures.

My device consists, essentially, of a sprocket-wheel having inner and outer ring portions, between which is a clutch to permit the outer ring to turn freely on the inner ring in one direction only, the inner ring being adapted to screw on in place of the ordinary solid sprocket, a lock-nut provided with an outer friction-surface forming one member of the brake, a casing inclosing the brake mechanism, and a friction-band surrounding said nut and secured at one end to the casing and having a projection at the other end to temporarily engage the sprocket-wheel when the latter turns backward and to permit the said wheel to turn forward freely.

My invention further consists in the novel construction of the rear sprocket and clutch, whereby the same is assembled or taken apart by passing the balls through radial openings in the inner ring, and in making the concave surfaces that engage the balls of the same radius as the balls, whereby the structure is made simpler and more durable.

In the form shown A represents the sprocket end of a hub having the usual right and left thread to engage the sprocket and lock-nut, B the axis-bolt, and C the frame, all as usually constructed. D is the inner ring of the sprocket, having an internal thread to fit the right-hand thread of the hub and a series of radial openings D', adapted to permit the balls F to pass therethrough and from which extend inclined concave channels D'', adapted to receive said balls F. Beneath these balls is a circumferential groove E to receive a spring-wire G to yieldingly hold the balls outward into engagement with an internal groove H' in the inner surface of an outer ring H, surrounding the ring D and rotative thereon and also held in place thereon by the balls F. Said outer ring constitutes the rear sprocket proper. The groove H' and channels D'' are transversely of the same radius as the balls F and contact the same throughout their entire circumference, which greatly reduces the tendency to crush the balls. An inclined opening E' extends from the interior of the ring diagonally outward to the groove E, and said groove is cut deeper opposite the balls to permit the spring G to yield at these parts. To connect the parts of the sprocket, the ring D is first placed in the ring H and the balls F inserted through the openings D' in succession and the wire inserted through the opening E'' and moved forward to engage the balls in succession. As the outer ring turns forward the balls simultaneously roll forward and wedge between the inclined channels D' and the groove H' in the outer ring and transmit forward motion to the hub. As the outer ring turns backward the balls roll back against the shoulders opposite the channels D' and then turn freely between the groove in the outer ring and the spring, thus permitting the inner ring to run forward for coasting. The balls being held out by the spring do not rattle and also do not fall forward by gravity. They thus all act simultaneously.

The rotating member of the brake consists of a ring J, having a screw-threaded opening adapted to engage the left-hand thread on the end of the hub and jam against the ring D, thus acting as a lock-nut for the sprocket, said ring being also provided with an outer periphery adapted to engage a friction-band. Surrounding this ring J is a band K, having one end secured to the inside of a non-rotative casing I by means of the rivet K' and provided at the other end with a laterally-projecting pivoted pawl L to engage a tooth of the sprocket-wheel and having a downwardly-projecting lug L" engaging the smooth inner side of the sprocket-wheel and pressed against the same by the lateral spring of the band K. Thus when the sprocket-wheel is running forward the frictional contact of the lug with the same turns the pawl L inward and out of contact with the teeth, and it passes the same without noise, vibration, or wear. As the sprocket turns backward the said contact turns the pawl outward and into engagement with one of the teeth of the sprocket and carrying the free end of the band backward tightens it around the ring J, and thus retards the rotation of the wheel. The pawl is also oppositely extended at L' and engages with the side of an opening M in the case, forming a lever fulcrumed on its pivot, which adds materially to the power applied to the brake and also stops the turning of the pawl backward on its pivot.

The case I surrounds the brake mechanism, and its flange abuts closely against the sprocket-wheel, near the teeth thereof. Said case also has a formed extension I' of its outer vertical plate, which extension is provided with an integral and outwardly-turned concave hook to adjustably engage the side of the lower tube of the frame, and thus prevent turning of the case by the strain of the brake-band.

To throw the brake out of action, I provide a slide N, which moves longitudinally on the extension I' and when moved inward covers the opening M in the case. Whenever the pawl L is turned out of the plane of the teeth of the sprocket the extension L' is withdrawn from the opening M and is wholly within the case. The slide N, being moved inward over the said opening, engages the extension L' and prevents the turning of the pawl L outward within the plane of the sprocket-teeth, and thus prevents application of the brake by the backward movement of the sprocket-wheel.

The operation of my device will be readily understood from the foregoing description. When forward pedaling, the balls hold the outer ring from turning on the inner ring, and thus drives the hub. When the pedals are held stationary for coasting, the outer ring stands still and the hub and inner ring run freely forward, but any movement backward of the sprocket throws out the pawl and applies the brake. It will also be observed that the device is very simple and well adapted to displace the solid sprocket and lock-nut and engage the frame of a bicycle as usually constructed.

It will also be observed that the rear sprocket is so constructed that the clutch mechanism requires no side opening or removable parts to permit the insertion or removal of the balls, thus materially simplifying the construction. Also that no side flanges are required, thus reducing the space required for the rear sprocket.

Having thus fully described my invention, what I claim, and wish to secure by Letters Patent, is—

1. The combination of an outer ring having a continuous internal groove, an inner ring adapted to turn freely within the outer ring, and in the same plane, inclined channels at intervals in the periphery of the inner ring, and radial openings, extending from the inclined channels, to the opening of the inner ring, whereby the balls are inserted and removed by passing the same radially through said openings for the purpose of assembling and disassembling the device, balls adapted to pass through said radial openings and engage the said groove and channels, and means for retaining the balls in operative position, substantially as described.

2. In a sprocket-wheel, an inner ring adapted to be attached to the hub of a bicycle and having radial openings to permit the passage of the balls therethrough and inclined channels, an outer ring having an internal groove, said channels and groove being semicircular in cross-section, balls having the same radius as said channels and groove and engaging the same, and a spring-support for said balls, said support being removable to permit the balls to pass through the radial openings in the inner ring, substantially as described.

3. In a bicycle, the combination of an inner ring attached to the driving-hub and having radial openings adapted to permit the passage of the balls therethrough and inclined channels extending one way from the radial openings, and a circumferential groove deeper opposite said openings, and an inclined opening from said groove to the central opening of the inner ring; an outer ring rotative on the inner ring and having radial sprocket-teeth and an internal groove, balls connecting said rings, and an integral spring-wire in the groove of the inner ring and engaging each of said balls, substantially as described.

4. In a bicycle, a driving-wheel and a sprocket-wheel independently rotative, a clutch connecting the sprocket-wheel with the driving-wheel to turn the latter forward and to allow the same to run forward freely, a friction-surface attached to the driving-wheel, a band engaging said friction-surface and having one end fixed and its free end, adapted to yield laterally, and provided with a projection to engage the teeth of the sprocket-wheel whenever the said wheel is turned backward, substantially as described.

5. In a bicycle, a driving-wheel and a sprocket-wheel independently rotative, a clutch connecting the same, a friction-surface attached to the driving-wheel, a band engaging the friction-surface having one end attached to a fixed support, a pawl pivoted to the free end of the band and temporarily engaging the teeth of the sprocket-wheel and carrying the free end of the band backward with the sprocket-wheel whenever the latter is turned backward, and means for limiting the movement of the pawl on its pivot, substantially as described.

6. In a bicycle, a driving-wheel and a sprocket-wheel independently rotative, a clutch connecting the same, a friction-surface rotating with the driving-wheel, a band engaging the friction-surface and having one end attached to a fixed support and the other end movable, a pawl pivoted to the movable end of the band and engaging the teeth of the sprocket-wheel, means for limiting the movement of the pawl on its pivot, and a lug on said pawl engaging the side of the sprocket-wheel to turn the pawl on its pivot, substantially as described.

7. In a bicycle, a driving-wheel and a sprocket-wheel independently rotative, a clutch connecting the same, a friction-surface rotating with the driving-wheel, a band engaging the friction-surface and having one end attached to a fixed support and the other end movable, a pawl pivoted to the movable end of the band and engaging the teeth of the sprocket-wheel, a lug on the said pawl engaging the side of the sprocket-wheel to turn the pawl on its pivot, an extension of the pawl at the side of the pivot opposite the part engaging the sprocket-wheel, and a fixed support engaged by said extension, whereby the pawl operates as a lever to tighten the band, substantially as described.

8. In a bicycle, in combination with a sprocket-wheel adapted to freely turn backward on the driving-wheel, a friction-surface attached to the driving-wheel and rotative therewith, a case inclosing the same and attached to the frame, a band engaging said friction-surface and having one end attached to the case, a pawl pivoted to the other end of said band and having oppositely-extended portions, one of which portions engages an opening in the case and the other engages a tooth on the sprocket-wheel, and a lug on the pawl in frictional contact with the side of the sprocket-wheel, and an extension on the case having a hook to engage the lower bar of the frame, substantially as described.

9. In a bicycle, in combination with the driving-wheel, a sprocket-wheel adapted to turn freely backward on the same, a friction-surface attached to the driving-wheel and rotating therewith, a band engaging the friction-surface and fixed at one end, a pawl pivoted to the other end of said band and adapted to engage the sprocket-wheel when the latter turns backward, and a slide engaging said pawl to a clutch connecting said wheels to prevent such engagement, substantially as described.

10. In combination with the rear hub of a bicycle, an inner ring having an internal right-hand thread and radial openings and inclined channels; an outer ring having an internal groove and external sprocket-teeth, balls connecting said rings, a spring engaging each ball and pressing the same outward into the groove in the outer ring, a ring having an internal thread and serving as a jam-nut for the first-named ring and also having an external friction-surface, a case inclosing the same, a band engaging said friction-surface and attached at one end to the case, a pawl pivoted to the other end of the band and oppositely extended to operate as a lever by engaging the teeth on the sprocket-wheel at one end and an opening in the case at the other end, and an extension on the case having a hook adjustably engaging the lower bar of the frame, substantially as described.

In testimony whereof I affix my signature in presence of two witnesses.

FREDERICK P. HINCKLEY.

Witnesses:
JOHN McDEVITT,
BELLE M. ROWE.